Nov. 13, 1928.
A. J. FAUSEK ET AL
1,691,758
REDUCING VALVE
Filed June 24, 1926     2 Sheets-Sheet 2
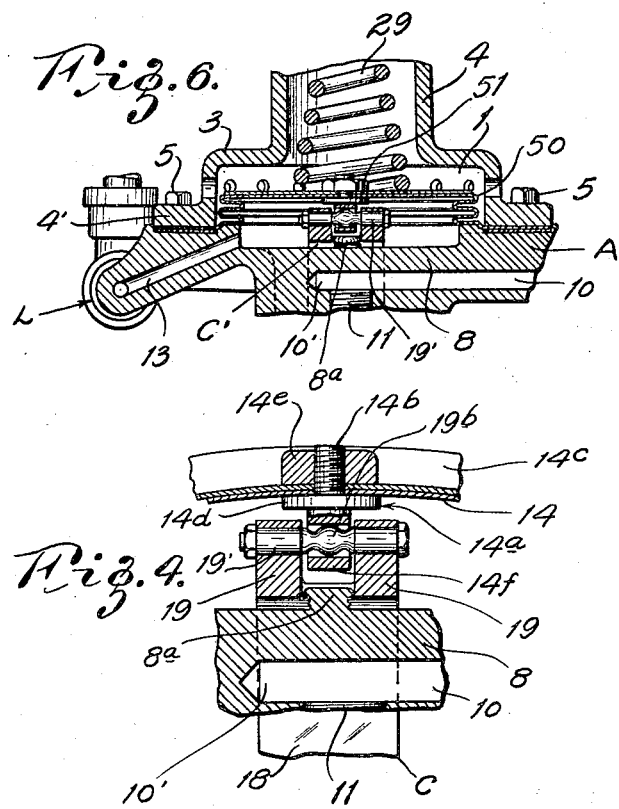
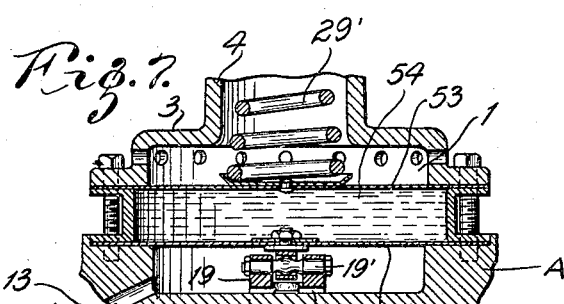
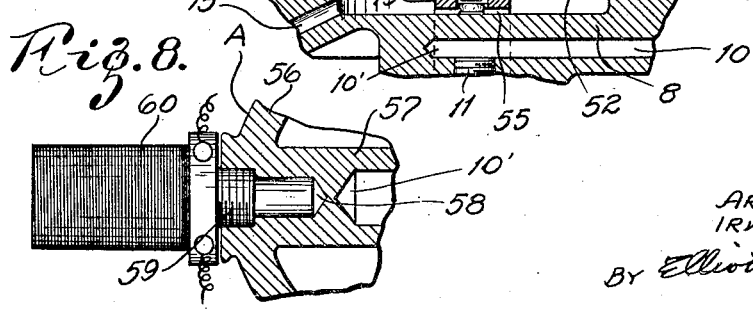
INVENTORS:
ARTHUR J. FAUSEK,
IRWING F. FAUSEK.
By Elliott Harrington
ATTORNEYS Patented Nov. 13, 1928.

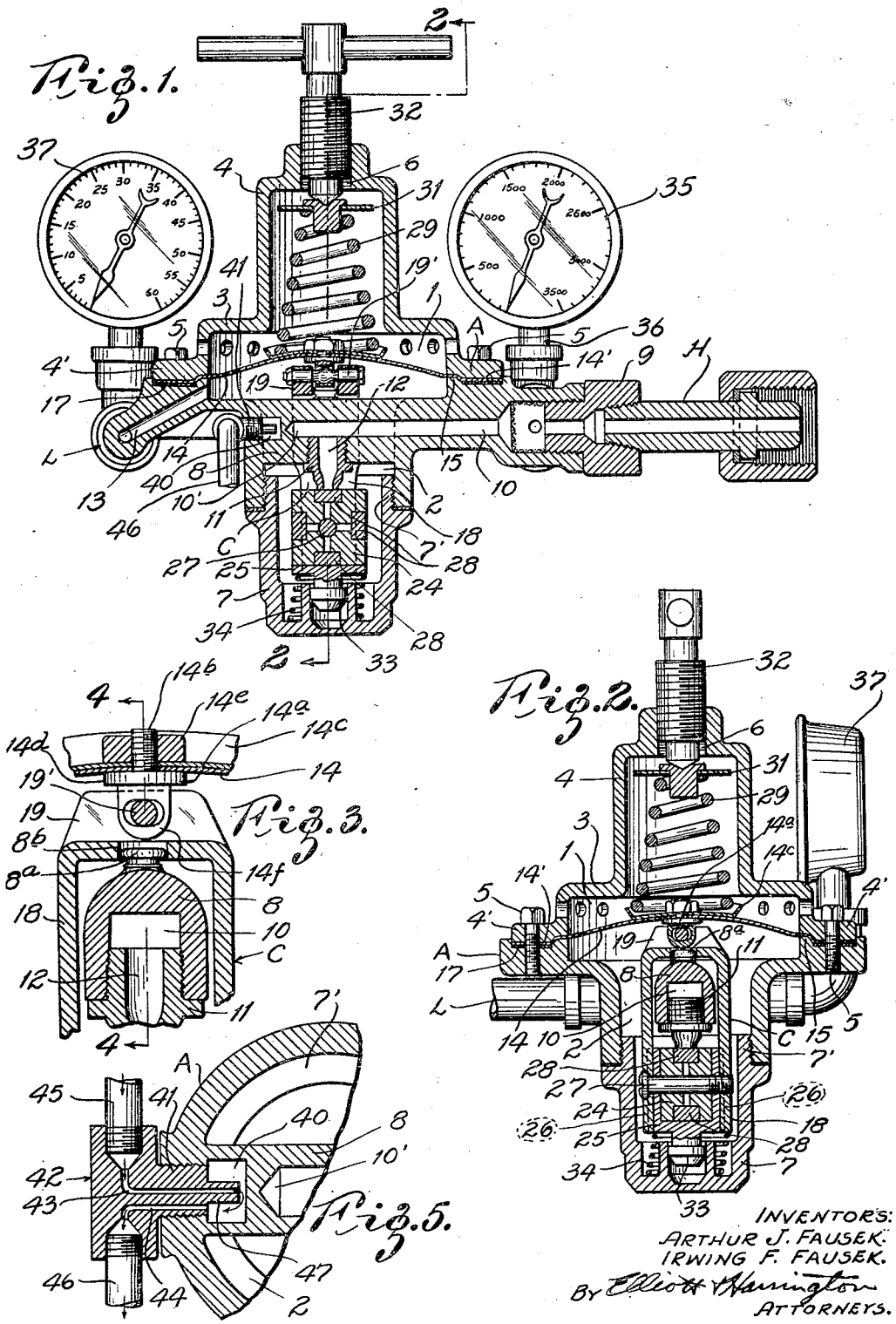

1,691,758

UNITED STATES PATENT OFFICE.

ARTHUR J. FAUSEK AND IRWING F. FAUSEK, OF ST. LOUIS, MISSOURI.

REDUCING VALVE.

Application filed June 24, 1926. Serial No 118,190.

Our invention relates generally to improvements in reducing valves, and, more specifically, to a reducing valve of the type having a diaphragm for regulating the flow of fluid under pressure through said reducing valve, an important object of the invention being to produce a reducing valve of the type described within which a highly flexible diaphragm, such, for instance, as one formed of rubber, may be used.

In most reducing valves provided with metallic diaphragms and which include valve-operating elements attached to and movable with said diaphragms, the diaphragms constitute guiding elements for said valve-operating elements. In other words, because the diaphragms are more or less rigid in a direction transversely thereof, the valve-operating elements are maintained in proper alinement within the reducing valves by said diaphragms. It is apparent, however, when highly flexible diaphragms, such as rubber diaphragms having fabric insertions, are employed, that said diaphragms do not possess sufficient rigidity in a direction transversely thereof to act as a guiding element for the valve-operating element, and in view of this fact, we have devised the reducing valve disclosed herein which, briefly stated, includes a diaphragm to which is attached a valve-operating element. The valve-operating element is provided with guiding means below the valve seat, as is common in reducing valves of the type disclosed, and in addition to these guiding means, our improved reducing valve is provided with guiding means immediately adjacent to the diaphragm. It is obvious in view of this arrangement that the valve-operating element is positively and accurately guided apart from the diaphragm, thus eliminating the necessity for the diaphragm acting as a guiding element for the valve-operating element.

If it were only necessary to arrange a second guiding means adjacent to the diaphragm to permit the use of highly flexible diaphragms in reducing valves of the type disclosed herein, the solution of the problem would be rather simple, but another element which complicates the problem arises from the fact that rubber diaphragms are often weak in spots or are inaccurately arranged in place within the reducing valve. The result of either of these conditions is that the diaphragms are not capable of being deflected uniformly throughout. Hence, a slight transverse movement is imparted to the diaphragms when same are flexed. It is apparent in view of the foregoing that if the valve-operating element were mounted in upper and lower guiding members, and also if said valve-operating element were securely fixed to the diaphragm, said diaphragm would be severely strained when transverse movement was imparted thereto, and to eliminate the likelihood of the diaphragm being strained, we connect the valve-operating element to the diaphragm in a manner to permit transverse movement of the diaphragm with respect to said valve-operating element. In this manner, the diaphragm will impart longitudinal movement to the valve-operating element to operate the valve; but if, because of imperfections of manufacture of the diaphragm or inaccurate assembling of same within the reducing valve, said diaphragm is caused to move transversely when flexed, this movement may take place freely without being retarded by the valve-operating element.

Another important object of our invention is to provide means whereby the moisture deposited within the reducing valve by the gases passing therethrough will not freeze in low temperatures.

Still another object of the invention is to so construct a reducing valve that the intense heat usually present at the valve seat due to the compression of the gases is greatly reduced.

Figure 1 is a vertical section of our improved reducing valve;

Figure 2 is a vertical section on line 2—2 of Figure 1;

Figure 3 is an enlarged fragmentary section showing the manner of attaching the valve-operating element of our improved reducing valve to the diaphragm thereof;

Figure 4 is a fragmentary section on approximately the same scale as Figure 3 and taken on the line 4—4 of Figure 3;

Figure 5 is an enlarged horizontal fragmentary section showing the means for preventing freezing of the reducing valve;

Figure 6 is a fragmentary vertical section of a modified form of our invention wherein a metallic diaphragm of the bellows type is shown;

Figure 7 is a fragmentary vertical section of another modification of our invention showing a pair of diaphragms between which liquid is arranged;

Figure 8 illustrates a modified form of the means for preventing freezing of the reducing valve.

In the drawings, A designates the housing of our improved valve which is provided with a diaphragm chamber 1. The lower portion of the cavity within the valve housing A constitutes a valve chamber 2 and, as seen in Figure 2, said diaphragm chamber and said valve chamber are in direct communication with each other. Secured to the valve housing A at a point immediately above the diaphragm chamber 1 is a diaphragm cover 3 which is provided with an upwardly extending hollow portion 4 and is secured by means of bolts or similar fastening devices 5 to the housing A. Formed in the top wall of the upwardly extending portion 4 of the diaphragm cover is an internally-threaded opening 6 which is intended for a purpose to be hereinafter set forth. 7 designates a cap having an externally-threaded portion 7' which is screwed into the valve chamber 2, said cap functioning as a closure member for the lower end of said valve chamber. Arranged transversely of the cavity within the housing A at a point immediately below the diaphragm chamber 1 is a bridge member 8. The bridge member 8 is not a solid wall separating the diaphragm chamber 1 from the valve chamber 3, as might appear from Figure 1, but is an integral bar the side faces of which are spaced apart from the wall of the housing so as to provide a space on either side of said bridge member 8 (Figure 2).

H designates a high pressure conducting member screwed into a socket 9 and communicating with an inlet passageway 10 formed in the bridge member 8. A valve seat member 11 screwed into the bridge member 8 is provided with a passageway 12 which forms a continuation of the inlet passageway 10 leading to the valve chamber 2.

A low pressure conducting pipe L communicates with a discharge passageway 13 formed in the wall of the housing A, said discharge passageway being arranged in communication with the diaphragm chamber 1.

14 designates a diaphragm arranged in the diaphragm chamber 1, said diaphragm being preferably formed of a highly flexible material, such, for instance, as rubber, and being arranged to rest upon an annular flange 15 at the top face of the valve housing A. An annular portion 14' of the diaphragm 14 extends upwardly and inwardly from the marginal portion of said diaphragm, and the portion of said diaphragm within said annular portion 14' is preferably bowed upwardly, as shown clearly in Figure 1. Located between the marginal portion of the diaphragm 14 and the portion of the valve housing by which said marginal diaphragm portion is supported is a gasket 17 adapted to prevent escape of fluid at the marginal edge of the diaphragm. To securely anchor the marginal edge portion of the diaphragm and the gasket 17 in place, we interpose said marginal edge portion of the diaphragm and said gasket between the top face of the valve housing A and the flange 4' of the diaphragm cover 4 and pass the threaded shanks of the bolts 5 through apertures in said diaphragm portion and said gasket. It is apparent that when the bolts 5 are screwed downwardly as far as they will go, a fluid-tight joint will be obtained between the valve housing, diaphragm and diaphragm cover.

$14^a$ designates a member provided with a threaded shank $14^b$ which is extended through an aperture in the diaphragm 14 and through a similar aperture in the lower wall of a spring seat $14^c$ arranged in contact with the top face of the diaphragm, as shown clearly in Figure 4. The member $14^a$ includes a disk portion $14^d$ which contacts with the lower face of the diaphragm, and $14^e$ designates a nut which is screwed on the threaded shank $14^b$ of the member $14^a$ and contacts with the top face of the lower wall of the spring seat $14^c$. It is apparent in view of the arrangement just described that the member $14^a$ is rigidly fixed to the diaphragm and will move therewith. $14^f$ designates a lug preferably formed integral with the member $14^a$, which lug extends downwardly from the disk portion $14^d$ thereof.

C designates a closure member which is arranged partly within the valve chamber 2 and partly within the diaphragm chamber 1, said closure member preferably comprising a U-shaped member 18 which straddles the bridge member 8 (Figure 2). The U-shaped member 18 is provided at its upper end with a pair of upwardly extended ears 19 between which the lug $14^f$ of the member $14^a$ extends, said lug $14^f$ and said ears 19 being provided with apertures through which a bolt 19' is passed. By referring to Figures 1 and 4, it will be noted that the bolt 19' is provided with a ball-like portion $19^b$ at the approximate center thereof, said ball-like portion being located within and movable longitudinally of an elongated aperture in the lug $14^f$ of the member $14^a$, and said ball-like portion being of approximately the same diameter as the aperture in said lug. It will also be noted by referring to Figure 1 that the space between the ears 19 is slightly greater than the width of the lug $14^f$, and also the apertures in the ears 19 through which the bolt 19' passes are approximately circular in shape and of approximately the same diameter as the bolt 19'.

In view of the construction just described, it is plain that the lug $14^f$ is capable of what practically amounts to universal movement with respect to the bifurcated upper portion of the U-shaped member 18, and, therefore, if for any reason transverse movement is imparted to the diaphragm when said diaphragm is flexed, the joint between the diaphragm and the U-shaped member 18 will in no wise tend to prevent said movement.

To provide means for guiding the upper portion of the U-shaped member 18, I provide the bridge member 8 with an upwardly extended rigidly fixed guiding member 8ª which extends through an aperture 8ᵇ in the upper wall of the U-shaped member 18, as shown in Figure 3.

The closure member C is provided with a head 24 at the lower end of the U-shaped member 18, said head being located between the upturned legs of a U-shaped member 25. The legs of the U-shaped member 25 are each provided with a rectangular depression 26 into which one of the legs of the U-shaped member 18 extends, and said U-shaped member 25 and said head 24 are secured to the U-shaped member 18 by means of a bolt 27 which passes through the legs of said U-shaped members 18 and 25 and through said head 24. From the foregoing, it is apparent that the U-shaped member 25 and head 24 are very securely fixed to the U-shaped member 18, the bolt 27 preventing vertical movement of said U-shaped member 25 and head 24, and because the side walls of the depression 26 are in contact with the edges of the legs of the U-shaped member 18, said member 25 and head 24 will be prevented from rotating about said bolt.

The head 24 is very frequently thrown into engagement with the valve seat 11, and this head is also subjected to the action of the fluid under high pressure escaping from said member 11. Consequently, the portion of the head which engages the valve seat member soon becomes worn or mutilated. To avoid the necessity of renewing and refinishing the head 24, it is preferably provided with a plurality of seats 28 any one of which may be arranged in position to close the valve seat member 11. In adjusting the head 24, the cap 7 is removed from the valve housing and the bolt 27 is withdrawn from its position. This will permit the U-shaped member 25 to be withdrawn from between the legs of the U-shaped member 18 and the head 24 may then be turned to the desired position after which the parts are reassembled.

Arranged within the portion 4 of the diaphragm cover 3 is a conical coil spring 29, said coil spring being interposed between the spring seat 14ᶜ, retained in place on the diaphragm by means of the nut 14ᵉ on the threaded shank 14ᵇ of the member 14ª, and a spring seat 31 at the upper end of said spring. Arranged within the internally-threaded opening 6 in the top wall of the diaphragm cover 3 is a hand-operated screw 32, the lower end of which contacts with the spring seat 31.

The lower end of the U-shaped member 25 is provided with an extension 33 which projects into a recess formed in the cap 7. The extension 33 is capable of moving longitudinally of the recess in the cap, and because the diameters of the extension 33 and the recess are approximately the same, said extension will function as a guiding element for guiding the lower end of the closure C. Interposed between the bottom wall of the U-shaped member 25 and the bottom wall of the cap 7 is a coil spring 34.

The spring 29 tends to force the head 24 away from the valve seat member 11, and the fluid pressure in the diaphragm chamber acting against the diaphragm tends to force said head into engagement with said valve seat member. Fluid passing from the high pressure member H flows through the inlet passageway 10 through the ported valve seat member 11 and into the valve chamber 2 from which it escapes to the diaphragm chamber by passing upwardly on either side of the bridge member 8. The fluid escapes from the diaphragm chamber through the discharge passageway 13 which communicates with the low pressure pipe L. When the pressure in the diaphragm chamber rises to a predetermined degree, the diaphragm is deflected, with the result of compressing the spring 29 and moving the head 24 into engagement with the flat bottom face of the ported valve seat member 11. This closes communication between the inlet and discharge passageways, and when the pressure drops to a predetermined degree, the head 24 recedes in response to the pressure of the spring 29. The pressure of the spring 29 is opposed by the fluid pressure on the diaphragm and the head reciprocates in response to these counter-acting pressures, so that the pressure in the low pressure pipe is maintained at a predetermined degree. The downward movement of the head 24 is resisted by the light spring 34 which serves as a shock-absorber and insures contact between the head 24 and the valve seat member 11 when the pressure of the spring 29 has been greatly reduced by the hand-operated screw 32 being unscrewed.

A high pressure gage 35 is attached to a member 36 having a passageway which communicates with the inlet passageway 10, and 37 designates a low pressure gage associated with the low pressure pipe.

By referring to Figure 1 of the drawings, it will be noted that the inlet passageway 10 extends beyond the passageway 12 in the valve seat member 11, as indicated by the reference character 10′. This arrangement is radically different from the arrangement of these passageways in other reducing valves of the type disclosed herein heretofore produced. Formerly, the inlet passageway terminated at the passageway in the valve seat member so that gases flowed into and through the passageway in the valve seat member without changing its direction of flow. The result of this arrangement was that intense heat was generated at the valve seat, due to compression of the gases, and this intense heat was found to have an injurious effect on the valve seats. By extending the inlet passageway 10 beyond the passageway 12 in the valve seat member, we provide what is, in effect, a trap in which the gases are compressed and wherein the greatest heat is present, whereby the temperature at the valve seat is greatly reduced. In the operation of our improved reducing valve, the gases pass through the inlet passageway 10 and into the trap beyond the passageway 12, after which said gases are forced to reverse their direction of movement a slight distance to pass into the passageway 12.

40 designates a cavity formed through the wall of the valve housing and extended into the bridge member 8 (Figures 1 and 5). This cavity is provided with a threaded opening into which the threaded extension 41 of an approximately T-shaped member 42 is screwed. The T-shaped member 42 is provided with a fluid passageway 43 and a fluid passageway 44, both of which are open at the inner end of the threaded extension of the T-shaped member, as shown in Figure 5. Screwed into an enlarged threaded opening in communication with the fluid passageway 43 is an inlet pipe 45, and screwed into an enlarged threaded opening in communication with the fluid passageway 44 is an outlet pipe 46. It will be noted by referring to Figure 5 that the threaded extension of the T-shaped member 42 is provided with a reduced portion 47 through which the fluid passageway 43 passes, and the inner face of the reduced portion is spaced apart from the inner wall of the cavity 40.

It has been found in the operation of reducing valves of the type disclosed herein that moisture deposited in the valve housing by the gases will frequently freeze in low temperatures, this freezing action usually taking place close to the inner end of the inlet passageway 10. In view of this fact, we have devised the arrangement just described which permits of hot fluid, such as steam, water, or hot air, being passed through the inlet pipe 45 and passageway 43 into the cavity 40 and out of said cavity through the passageway 44 and outlet pipe 46. In this manner, hot fluid may be caused to circulate through the cavity 40 whereby the parts of the valve housing adjacent to said cavity will be heated sufficiently to prevent freezing of the moisture within the valve housing.

Figure 6 illustrates a modified form of our invention wherein a metallic diaphragm 50 of the bellows type is employed instead of a highly flexible diaphragm formed of rubber or similar material as in the preferred form of the invention. It has been found in connection with the use of a bellows diaphragm that there is often a tendency for the diaphragm to move transversely when flexed, and if the closure member C' is rigidly fixed to said diaphragm, said closure member will be moved out of its proper alinement, thus affecting the efficiency of the valve. We therefore provide our reducing valve, when it is provided with a bellows diaphragm, with an upper guide member 51 which is located immediately beneath the diaphragm, whereby the upper end portion of the closure member is positively guided. Also, the means for attaching the bellows diaphragm 50 to the closure member C' is the same as the means employed for attaching the diaphragm shown in the preferred construction illustrated in Figure 1 to the closure member C in said view. In accordance with the arrangement shown in Figure 6, the closure member is positively guided at its upper end apart from any support which the diaphragm may provide, and because of the loose joint between the diaphragm and the closure member, the diaphragm may move transversely a slight distance with respect to the upper end of the closure member.

In Figure 7, we illustrate another modified form of our invention wherein a pair of spaced-apart diaphragms 52 and 53 are employed. Interposed between the diaphragms 52 and 53 is a body of suitable liquid 54. In the operation of a reducing valve constructed as shown in Figure 7, movement imparted to the diaphragm 52 by the gases will be imparted by the body of liquid to the diaphragm 53 and movement imparted to the diaphragm 53 by the coil spring 29' will be imparted to the diaphragm 52 by the body of liquid. In connection with the construction shown in Figure 7, we find that there is a tendency for the diaphragms to move transversely a slight distance due to imperfections therein or because of inaccurate assembling of the diaphragms within the valve housing, and we therefore connect the closure member 55 to the diaphragm 52 by means of the same loose joint which has already been fully described in connection with the preferred construction of the invention.

In Figure 8, we illustrate a modified form of the means for preventing freezing of moisture within our reducing valve. In this form of the means referred to, we provide the wall of the valve housing 56 and the bridge member 57 with a cavity 58 into which a member 59 formed of suitable heat-conducting material is secured. Arranged about a portion of the member 59 is an electrical resistance coil 60. In the operation of the means shown in Figure 8, the passage of electrical energy through the coil 60 will cause the member 59 to be heated, and because this member 59 is in direct contact with the wall of the valve housing and with the bridge member, the heat will be transmitted to these parts, thus preventing freezing of moisture within the valve housing.

By referring to the lower portions of Figures 1 and 2, it will be noted that the upper and lower ends of the coil spring 34 are not in vertical alinement with each other. This arrangement has the effect of forcing the extension 33 firmly against one side of the recess in which said extension is arranged, whereby chattering of the valve is prevented.

We claim:

1. A reducing valve comprising a housing having inlet and discharge passageways, a diaphragm arranged within said housing, a closure member adapted to close communication between said inlet and discharge passageways, and a loose connection between said diaphragm and said closure member, said loose connection comprising an element extended from said diaphragm, an element extended from said closure member and a bolt having an approximately spherical portion extended through apertures in said elements, said spherical portion of said bolt being located within the aperture in one of said elements and being adapted to permit said element to move universally with respect to the associated element.

2. A reducing valve comprising a housing having inlet and discharge passageways, a diaphragm secured within said housing, a closure member adapted to close communication between said inlet and discharge passageways, and a loose connection between said diaphragm and said closure member, said loose connection between said diaphragm and said closure member comprising a pair of spaced lugs on one of said elements, a lug on the associated element and a bolt extended through apertures in said lugs, said bolt being provided with a spherical portion which is located within the aperture in one of said lugs, whereby said lug may move universally with respect to the associated lugs.

3. A reducing valve comprising a housing having inlet and discharge passageways, a diaphragm arranged within said housing, a closure member adapted to close communication between said inlet and discharge passageways, and a loose connection between said diaphragm and said closure member, said loose connection comprising a pair of spaced lugs on said closure member, a lug on said diaphragm arranged between said spaced lugs and a bolt extended through apertures in said lugs, the lug on said diaphragm being of substantially less width than the space between the spaced lugs and said bolt being provided with a spherical portion which is located within the aperture in the lug on said diaphragm, whereby the last mentioned lug may move universally with respect to the associated lugs.

4. A reducing valve comprising a housing having inlet and discharge passageways, a diaphragm arranged within said housing, a closure member adapted to close communication between said inlet and discharge passageways, and a loose connection between said diaphragm and said closure member, said loose connection comprising a pair of spaced lugs on said closure member, a lug on said diaphragm located between said spaced lugs and a bolt extended through apertures in said lugs to connect same together, said bolt having a spherical portion and the aperture in the lug on the diaphragm being elongated and being adapted to receive said spherical portion of said bolt, said lug on said diaphragm being of substantially less width than the space between said spaced lugs, whereby the lug on said diaphragm may move universally with respect to said spaced lugs.

5. A reducing valve comprising a housing having inlet and discharge passageways, a diaphragm arranged within said housing, a closure member adapted to close communication between said inlet and discharge passageways, a guiding member movable with said closure member and arranged to slide within a recess, and a coil spring surrounding said guiding member and in contact with said closure member, said coil spring being arranged at an angle to the longitudinal axis of said guiding member, whereby said guiding member is forced firmly against the wall of the recess at one side of said recess.

6. A reducing valve comprising a housing having inlet and discharge passageways, a diaphragm arranged within said housing, a closure member adapted to close communication between said inlet and discharge passageways, a loose connection between said diaphragm and said closure member, said loose connection comprising an element extended from said diaphragm, an element extended from said closure member and a bolt having an approximately spherical portion extended through apertures in said elements, said spherical portion of said bolt being located within the aperture of one of said elements and being adapted to permit said element to move universally with respect to the associated element, a guiding member associated with said closure member at the lower end thereof, and a guiding member associated with said closure member at the upper end thereof adjacent to said diaphragm.

7. A reducing valve comprising a housing having inlet and discharge passageways, a diaphragm arranged within said housing, a closure member adapted to close communication between said inlet and discharge passageways, a guiding member movable with said closure member, a member arranged in telescopic relation with said guiding member, and a coil spring surrounding said guiding member and in contact with said closure member, said coil spring being arranged at an angle to the longitudinal axis of said guiding member, whereby said guiding member is forced firmly into contact with the telescopic member associated therewith.

8. A reducing valve comprising a housing having inlet and discharge passageways, means adapted to close communication between said inlet and discharge passageways, a bridge member within said housing in which said inlet passageway is arranged, and means whereby a heat-producing medium may be passed into said housing to prevent freezing of moisture therein, said means including a cavity in said bridge member immediately adjacent to a portion of said inlet passageway, and a conductor for the heat-producing medium extended into said cavity.

In testimony whereof, we have hereunto set our hands.

ARTHUR J. FAUSEK.
IRWING F. FAUSEK.